UNITED STATES PATENT OFFICE.

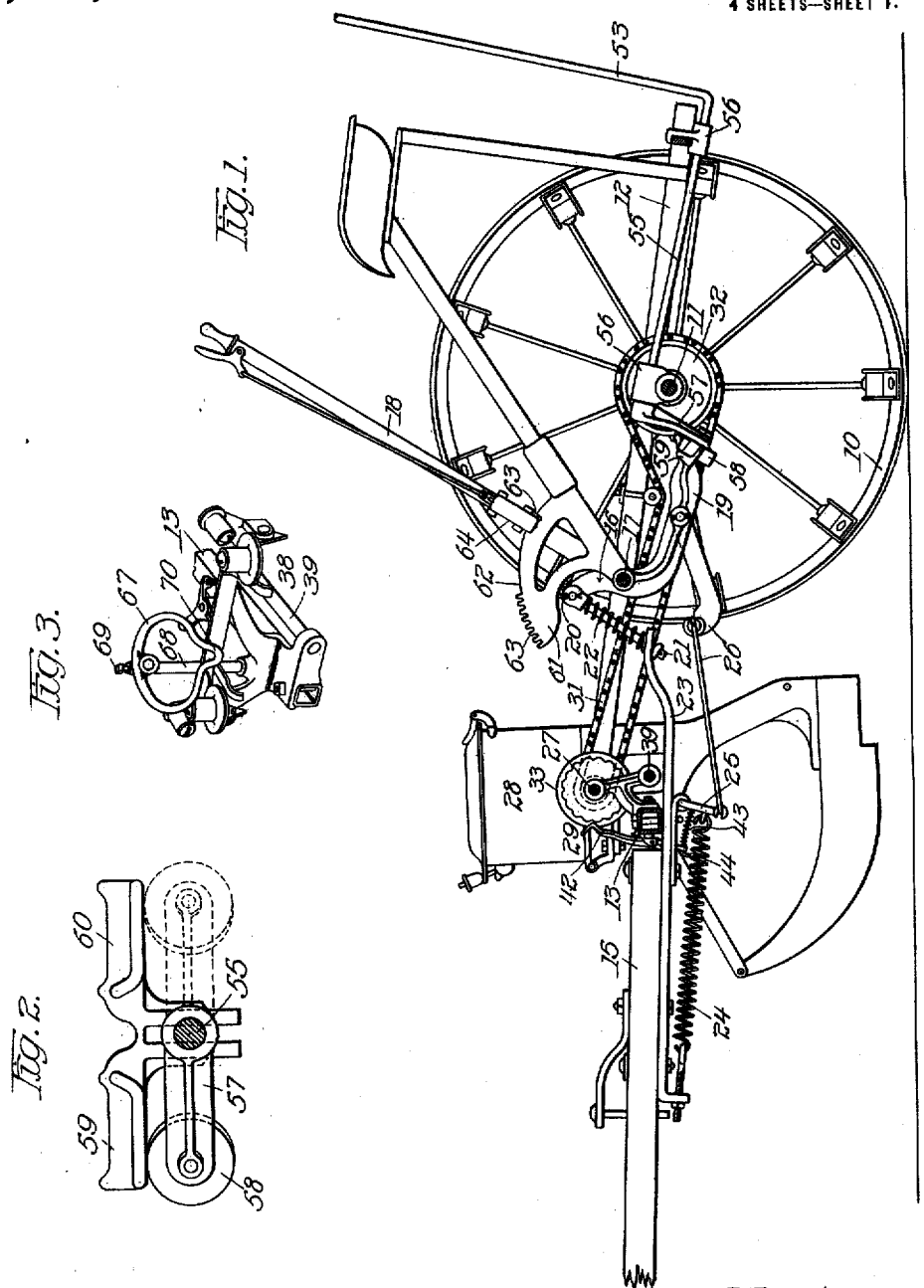

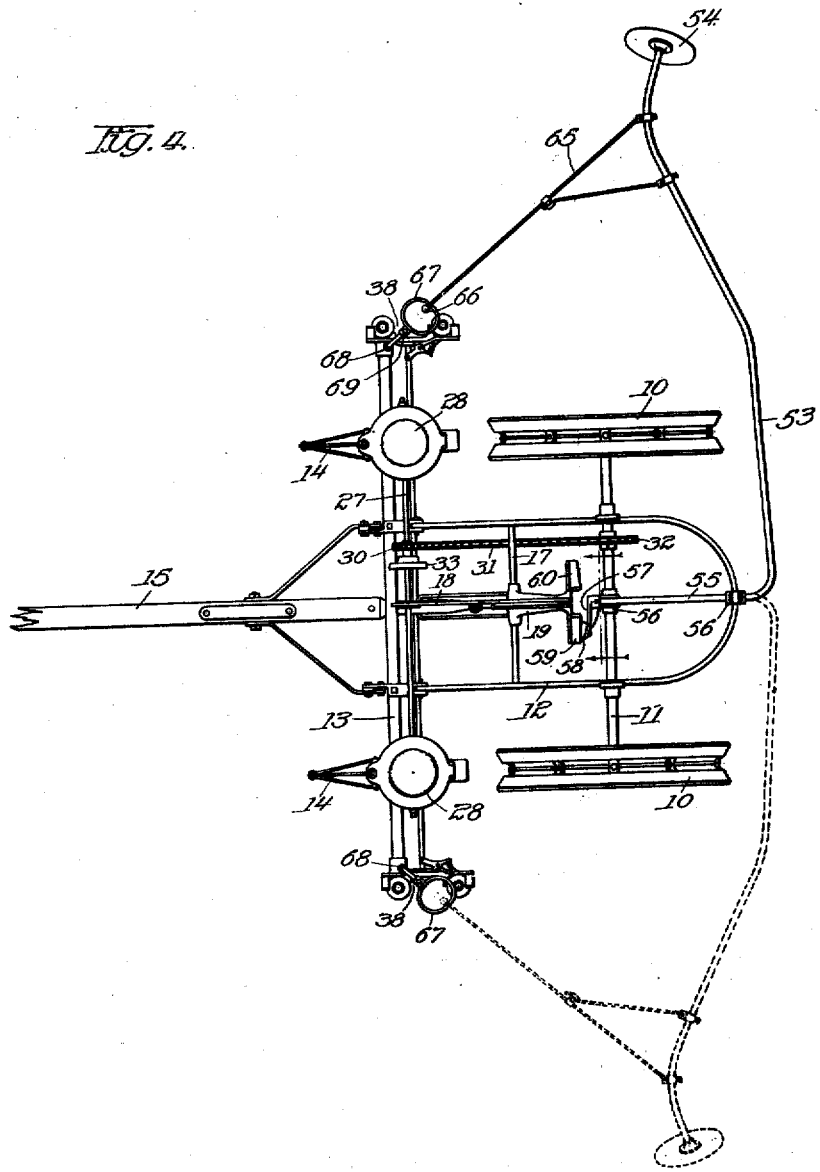

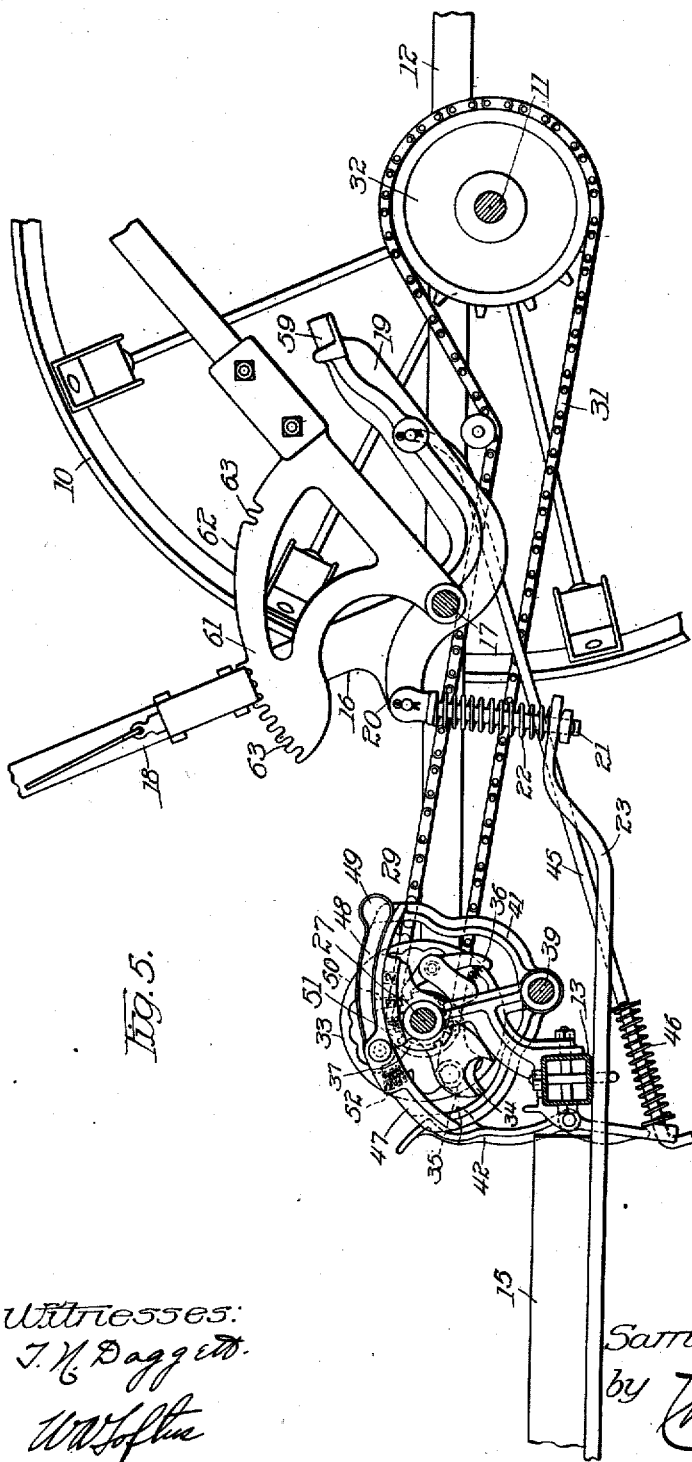

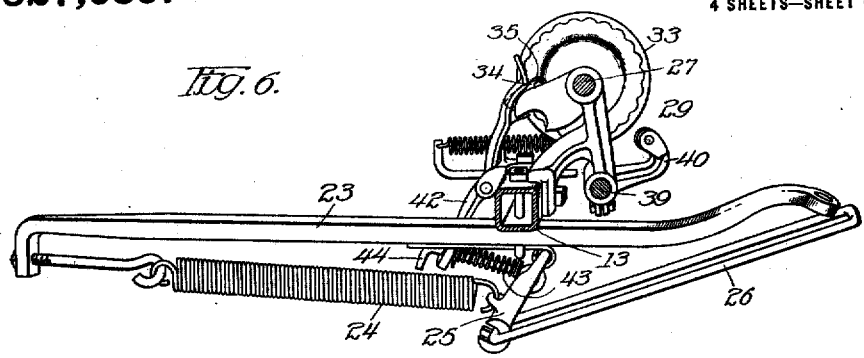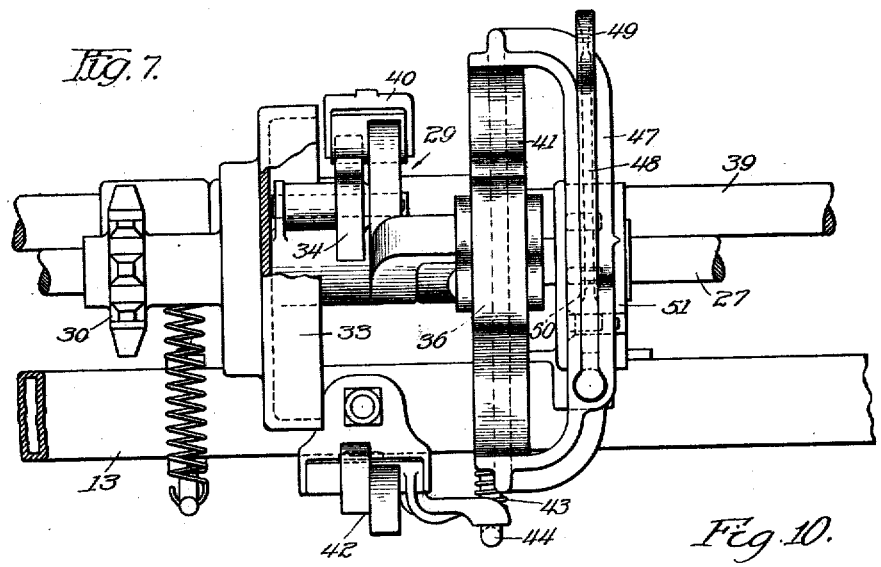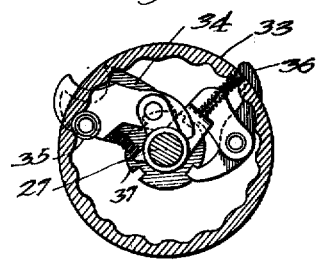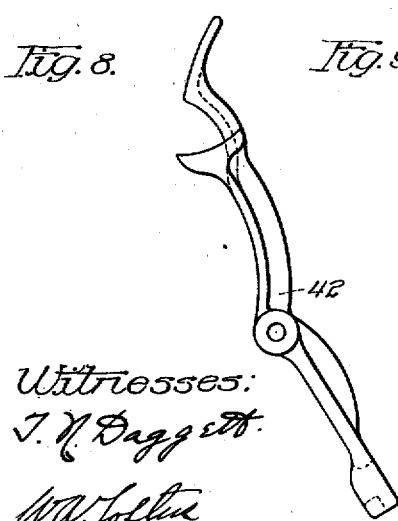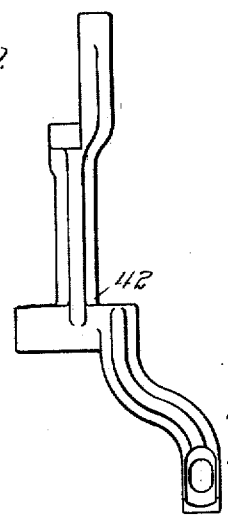

SAMUEL K. DENNIS, OF CHICAGO, ILLINOIS, ASSIGNOR, BY MESNE ASSIGNMENTS, TO INTERNATIONAL HARVESTER COMPANY, A CORPORATION OF NEW JERSEY.

SEED-PLANTER.

1,327,089.     Specification of Letters Patent.     Patented Jan. 6, 1920.

Application filed September 15, 1913. Serial No. 789,837.

*To all whom it may concern:*

Be it known that I, SAMUEL K. DENNIS, a citizen of the United States, residing at Chicago, in the county of Cook and State of Illinois, have invented certain new and useful Improvements in Seed-Planters, of which the following is a full, clear, and exact specification.

My invention relates to seed planters.

It is the object of my invention to improve and simplify the construction and operation of a seed planter of the check row type. This object I accomplish by means of an improved clutch and tripping mechanism therefor operable through an improved frame adjusting lever to throw the seed dropping mechanism into operative position when the furrow openers are lowered to planting position, and into inoperative position when the furrow openers are raised for turning corners or transporting the planter from place to place, and an improved land marker operated in an improved manner by the frame adjusting lever to shift from side to side of the planter as the furrow openers are raised and lowered.

One form which my invention may assume is exemplified in the following description and illustrated in the accompanying drawings, in which—

Figure 1 shows a vertical central sectional view of my improved corn planter;

Fig. 2 shows a detail view of the operating mechanism for the marker arm;

Fig. 3 shows a detail view of the means employed for receiving the brace rod on the marker arm;

Fig. 4 shows a plan view of a corn planter illustrating the operation of the improved marker arm employed in my device;

Fig. 5 shows a vertical sectional view of a portion of a planter with a modified form of my improved clutch and tripping mechanism therefor applied to the seed dropping shaft;

Fig. 6 shows a perspective view of my improved clutch tripping mechanism and allied parts;

Fig. 7 shows a detail view of my improved seed dropping clutch;

Fig. 8 shows a detached view of the clutch tripping lever employed in my device;

Fig. 9 shows a view of the same taken from a different angle; and

Fig. 10 is a detail view showing the construction of the clutch mechanism illustrated in Fig. 5.

The planter illustrated in the accompanying drawings comprises carrying wheels 10, an axle 11, a main or supporting frame 12 carried on said axle, a runner or furrow opener frame 13 hinged to said supporting frame, furrow openers 14, a draft tongue 15 connected to both of said frames, and a frame adjusting lever 16 carried on a transverse shaft 17 fixed to the supporting frame.

The frame adjusting lever is preferably in the form of a bell crank and comprises an upwardly extending hand portion 18, a rearwardly extending foot portion 19, and a forwardly extending lug 20. For raising the runner frame a yielding connection is formed between the forwardly extending lug 20 and said frame, comprising a rod 21 carrying a pressure spring 22 and pivoted at one end to the forwardly extending lug and having its other end slidably received in a brace bar 23 fixed to the runner frame and to the tongue. To assist the operator in moving the lever to raise the frame, I provide a counterbalancing spring 24 connected at its forward end to the brace bar 23, and at its other end to a pendent arm 25 carried on said brace bar, said arm in turn being connected at its lower end to the foot portion of the lever 16 by means of a double link connection 26.

A seed shaft 27 operatively connected to seed plates in the seed boxes 28 is carried on the runner frame. A clutch mechanism 29, operated by a continuously rotating sprocket wheel 30, imparts an intermittent variable movement to the seed shaft. The sprocket wheel 30 is operated in the usual manner by means of a chain 31 connected to a sprocket wheel 32 on the axle of the planter.

The clutch mechanism 29 comprises an internal toothed ratchet wheel 33 operated continuously by the sprocket wheel 30, and a pawl member 34 carrying a roller 35, which roller is designed to coact with the internal teeth on the ratchet wheel and impart a rotatable movement to said pawl. The pawl 34 is connected for joint rotation to a springpressed pawl 36, and this latter pawl coacts with a second ratchet wheel 37 to impart movement thereto. The intermittent movement of the clutch is secured through the operation of check row mechanism 38, which, as is well known, imparts a reciprocal movement to a check row shaft 39 carrying a knock-out arm 40, which arm is held normally in position to engage the pawl 34 and move it inwardly a sufficient distance to disengage the roller thereon from the ratchet teeth. The ratchet wheel 37 is connected direct to the seed shaft and a swinging cam member 41 is provided for the purpose of engaging the pawl 36 and throwing it out of operative connection with the ratchet wheel at varying degrees in its angular movement. The different points at which the pawl is disengaged from the ratchet wheel are adjustable so that the seed shaft will be rotated a greater or less distance to permit two, three or four, or any number of seeds, to be dropped by the seed plates during one complete revolution of the clutch members.

I have provided means in connection with the clutch mechanism for throwing it in and out of operative position as the runner frame is raised and lowered. This means comprises a trip lever 42 pivoted to the runner frame with its upper end in position to engage, when at one limit of its movement, the pawl member 34. The trip lever operates similar to the knock-out arm to move the pawl member 34 inwardly and disengage the roller thereon from the ratchet wheel. The lower end of the trip lever is connected in a yielding manner by a pressure spring 43 and a slide rod 44 to the pendent arm 25. Obviously, the movement imparted to the pendent arm by the lever 16 is such that it is swung rearwardly when the runner frame is lowered. This rearward movement of the pendent arm will swing the upper end of the trip lever forwardly away from the path of the pawl 34 and permit the clutch mechanism to be operated in the ordinary manner. However, when the runner frame is raised, the pendent arm is swung forwardly by the spring 24 and this operates to move the upper end of the trip lever rearwardly to a position where it will engage the pawl 34. Preferably, the position of the trip lever is forward of the knock-out arm, and by disengaging the pawl from the ratchet before it reaches the knock-out arm, nothing, therefore, depends upon the operation of said arm, and it may be moved to any position by the check row mechanism and still not interfere with the desired inoperativeness of the clutch mechanism.

A slightly modified arrangement of the connecting means between the frame adjusting lever and the trip lever is shown in Fig. 5. This form is particularly adapted for use on planters where the counterbalancing spring is not employed and it comprises a link member 45 pivoted to the foot portion of the lever 16 and slidably connected to the lower end of the trip lever. Adjacent the trip lever, in position on the link 45, is a pressure spring 46 for rendering the connection yieldable.

With reference to the swinging cam employed in my device, it is desirable that it be not projected upwardly beyond the top of the ratchet wheel 33; this is for the reason that in crating the planter for shipping purposes, when the cam extends above the ratchet wheel, it becomes liable to breakage on account of its exposed position. The handle for shifting the cam has heretofore been projected upwardly, and thereby subjected to the same danger. The cam, it will be understood, is in a plane with and surrounds the pawl member 36. The points where the cam engages the pawl are confined to its lower annulus, and I have taken advantage of this fact in constructing a cam that is not projected above the ratchet wheel 33. As shown in Fig. 7, the cam is provided with an offset top portion 47 that is but slightly curved in a vertical direction and passes to one side of the plane of the pawl member 36, preferably a short distance below the upper plane of the ratchet wheel 33. A handle 48 is pivoted to the cam and extends in the same direction with the top portion thereof. I prefer to so form this handle that it fits the contour of the top portion 47 with only its outer end 49 projecting and then only for a distance sufficient to permit the operator to grasp the handle and raise it when shifting the cam. A lug 50 is fixed to the handle on its under side and is designed to project into one of a plurality of openings formed in a stationary plate 51. Each of the openings in the plate is labeled with the numeral corresponding to the number of seeds that are planted when the cam is in position with the lug occupying that opening. A spring 52 is provided for the handle to keep it normally in its lowered position, where the lug 50 will be held in one of the openings in the stationary plate.

In connection with the frame adjusting lever there is provided a marker arm 53, carrying at its outer end a land marker 54. The arm is in the form of a crank, with a shaft portion 55 carried in bearings 56 fixed to the axle of the carrying wheels and the rear end of the supporting frame. On the inner end of the shaft portion 55 is an operating arm 57 carrying a roller 58 in position to be engaged by horizontally arranged plates 59 and 60 formed on the rear end of the foot portion 19 of the frame adjusting lever. As shown in Fig. 2, these plates are placed a slight distance apart, with their inner ends upwardly curved to receive between them the roller 58. The operating arm is positioned in parallel relation to the marker arm so that when the marker is in engagement with the ground, the operating arm projects horizontally in a direction opposite to that of the marker arm. Therefore, when the lever 16 is moved rearwardly to raise the marker frame, the foot portion 19 thereon engages the roller on the operating arm and forces it downward, thereby raising the marker arm to a vertical position, where its momentum carries it past dead center, and it is permitted to drop to the ground on the opposite side as the runner frame is again lowered.

Necessarily, considerable force is required to raise the marker arm, and therefore the advantage of having the lever 16 operated by both hand and foot power can be appreciated. In this connection it will also be noted that I have provided for the lever 16 a quadrant 61 having a blank portion 62 formed on its periphery, with a series of teeth 63 at either side thereof. This construction is made possible by the fact that between the upper or traveling position of the runner frame and the position where the runners contact with the ground, a considerable space intervenes, within which the clutch tripping lever 42 is shifted from engaging to disengaging position with the pawl 34. This space is represented on the quadrant by the blank portion, and by having it cam-shaped, as shown, the operator may, upon reaching the blank portion with the lever, release the detent mechanism 64 and concentrate his efforts upon the task of quickly moving the lever to the end that the marker arm may be raised with considerable speed, and thus carried past its dead center. Obviously, the detent will be automatically raised by the cam-shaped portion as the lever is moved, and upon reaching the upper series of teeth the detent will drop into the first notch, and thus the lever will be stopped exactly in the position where the marker arm will be carried past its center and where the clutch tripping lever will be in complete engagement with the pawl 34. On the return movement of the lever the blank portion on the quadrant prevents the operator from adjusting the lever 16 in a position where the clutch tripping lever is but partially disengaged from the pawl, and thereby the possibility of breakage is greatly lessened.

At the outer end of the marker arm a brace rod 65 is rigidly fixed, and on the end of this rod is an enlarged head portion 66. To receive the head 66 as the marker arm is swung from side to side is a loop member 67 on either side of the runner frame carried on a shaft 68 adjustably fixed to the end of said frame. A set screw 69 renders the loop 67 adjustable upon the shaft 68. The loop member is provided on its rearward portion with a downwardly extending tapered slot 70, as shown in Fig. 3, and as the marker arm is lowered to either side of the planter, the head portion 66 falls within the loop and is drawn into the slotted portion 70, where it is securely held, and thereby the marker arm is reinforced against rearward movement. From the size of the loop 67 it will be seen that considerable latitude is provided for independent movement of the head without danger of its missing connection therewith, and the loop being adjustable through its shaft 68, provision is thereby made for insuring a connection even though the brace rod or marker arm should become bent.

While I have shown and described certain specific embodiments of my invention, it is to be understood that it is capable of many modifications, and that changes may be resorted to in the details of construction without departing from the spirit of my invention as disclosed in the appended claims.

What I claim as my invention, and desire to secure by Letters Patent, is:

1. In a seed planter, traction wheels, a frame supported thereby, seed planting mechanism operatively connected to said traction wheels, a pivoted laterally movable land marker, and means for simultaneously disconnecting said dropping mechanism from said traction wheels and controlling said marker.

2. In a seed planter, furrow openers, seed dropping mechanism, a laterally shiftable land marker, unitary means for controlling the working movements of said openers, mechanism and marker, and independently operable means for controlling said seed dropping mechanism.

3. In a seed planter, adjustable furrow openers, seed dropping mechanism, an adjustable marker, means for simultaneously adjusting said furrow openers and said marker and for controlling the operation of said seed dropping mechanism, and independent means for controlling the operation of said seed dropping mechanism.

4. In a seed planter, traction wheels, vertically adjustable furrow openers, seed dropping mechanism, actuating means therefor operatively connected to said traction wheels, a laterally shiftable marker, and means independent of said traction wheels for simultaneously controlling the movements of said furrow openers and marker and the operation of said seed dropping mechanism.

5. In a seed planter, a source of power, adjustable furrow openers, seed dropping mechanism operatively connected to said source of power, a marker including a pivoted marker arm, and means for simultaneously adjusting said furrow openers, swinging said marker arm on its pivot, and for controlling the operative connections between said seed dropping mechanism and said source of power.

6. In a seed planter, vertically adjustable furrow openers, seed dropping mechanism, a marker including a pivoted marker arm, means for swinging said marker arm on its pivot as said furrow openers are vertically adjusted and for simultaneously controlling the operation of said seed dropping mechanism, and independent means for controlling the operation of said seed dropping mechanism.

7. In a seed planter, a supporting frame, a furrow opener frame movable with respect thereto, seed dropping mechanism carried on said furrow opener frame, clutch members for said seed dropping mechanism, a laterally shiftable marker carried by said supporting frame, and means controlled by the relative positions of said frames for throwing the clutch members into and out of operative position and for shifting said marker.

8. In a seed planter, a supporting frame, a furrow opener frame hinged to said supporting frame, a lever for adjusting the relative positions of said frames, seed dropping mechanism carried on said furrow opener frame, a laterally shiftable marker carried by said supporting frame, clutch members for said seed dropping mechanism, and means operated by said frame adjusting lever for tripping said clutch members into and out of operative position and for shifting said marker.

9. In a seed planter, a supporting frame, a furrow opener frame hinged thereto, a lever for said supporting frame for adjusting the relative positions on said frames, seed dropping mechanism carried on said furrow opener frame, clutch members for said seed dropping mechanism, a laterally shiftable marker carried by said supporting frame, means operated by said lever for throwing the clutch members into engaging and disengaging positions and for shifting said marker, and a counterbalancing spring for assisting in the movement of said lever.

10. In a seed planter, a supporting frame, a furrow opener frame hinged thereto, a bell crank lever pivoted to said supporting frame and connected to said furrow opener frame, seed dropping mechanism carried on said furrow opener frame, clutch members on said seed dropping mechanism, a trip lever on the furrow opener frame for throwing the clutch members into and out of engaging position, and connecting means between said tripping lever and bell crank lever whereby said trip lever is operated.

11. In a seed planter, a supporting frame, a furrow opener frame hinged thereto, a bell crank lever pivoted to said supporting frame and connected to said furrow opener frame, seed dropping mechanism carried on said furrow opener frame, clutch members on said seed dropping mechanism, a trip lever on the furrow opener frame for throwing the clutch members into and out of engaging position, and connecting means between said tripping lever and bell crank lever whereby said trip lever is operated, said connecting means comprising a pendent arm pivoted to said furrow opener frame, a connecting link between the pendent arm and trip lever, and a connecting link between the pendent arm and bell crank lever.

12. In a seed planter, a supporting frame, a furrow opener frame hinged thereto, a bell crank lever pivoted to said supporting frame and connected to said furrow opener frame, seed dropping mechanism carried on said furrow opener frame, clutch members on said seed dropping mechanism, a trip lever on the furrow opener frame for throwing the clutch members into and out of engaging position, connecting means between said trip lever and bell crank lever whereby said trip lever is operated, comprising a pendent arm connected to the furrow opener frame, a counterbalancing spring connected to said arm, a yielding connection between the trip lever and said pendent arm, and a link connection between the pendent arm and said bell crank lever.

13. In a seed planter, a supporting frame, a furrow opener frame hinged thereto, a lever on said supporting frame for raising the furrow opener frame, seed dropping mechanism carried on the furrow opener frame, a clutch mechanism on the seed dropping mechanism comprising a continuously rotating drive member and intermittently rotating driven member, and a trip lever in position to engage said driven member and disengage it from the driving member when said furrow opener frame is raised.

14. In a seed planter, a supporting frame, a furrow opener frame hinged thereto, a lever on the supporting frame for raising the furrow opener frame, seed dropping mechanism on the furrow opener frame, a clutch mechanism on the seed dropping mechanism having an intermittently driven member, means controlled by the raising of the furrow opener frame for throwing said intermittently driven member out of operative position, and a variable clutch member connected to the intermittently driven member comprising a ratchet and pawl, and a swinging cam to disengage said pawl.

15. In a seed planter, a supporting frame, a furrow opener frame hinged thereto, seed dropping mechanism carried thereby, a bell crank lever on said supporting frame for raising the furrow opener frame, a crank arranged to be engaged by said lever, a marker arm attached to said crank, said bell crank lever being so arranged that both hand and foot power may be applied thereto for the purpose of raising said marker in concert with the furrow opener frame, and means operable by said bell crank lever for controlling the operation of said seed dropping mechanism.

16. In a seed planter, a supporting frame, a furrow opener frame hinged thereto, seed dropping mechanism carried thereby, a bell crank lever pivoted to the carrying frame and connected to the runner frame and having a rearwardly extending portion provided with pedals, a crank arm arranged to be engaged by the rearwardly extending portion of said lever, a marker arm connected to said crank arm whereby the marker arm is raised in concert with said furrow opener frame, and means operable by said bell crank lever for controlling the operation of said seed dropping mechanism.

17. In a seed planter, carrying wheels, an axle for said wheels, a supporting frame on said axle, a furrow opener frame pivoted to the supporting frame, seed dropping mechanism carried thereby, a bell crank lever pivoted to the forward portion of said supporting frame and connected to the furrow opener frame, a crank arm arranged to be engaged by said bell crank lever in position forwardly of said axle, a marker arm connected to said crank arm whereby the marker arm is raised in concert with the furrow opener frame, and means operable by said bell crank lever for controlling the operation of said seed dropping mechanism.

18. In a seed planter, seed dropping mechanism, operating mechanism therefor including a constantly rotating member, a locking member adapted to connect said constantly rotating member with said seed dropping mechanism, and a plurality of independent means for engaging said locking member and disconnecting said constantly rotating member from said seed dropping mechanism.

19. In a seed planter, seed dropping mechanism, operating means therefor, including a clutch having a plurality of operating members, a locking member adapted to operatively connect said members with each other, and a plurality of independently operable means for actuating said clutch by engaging said locking member and changing the relation between said operating members, thereby disconnecting the operating means from said seed dropping mechanism.

20. In a seed planter, seed dropping mechanism, operating means therefor including a constantly operating clutch member and an intermittently operating clutch member, a locking member adapted to connect said clutch members, and a plurality of independently operable means for engaging said locking member and disconnecting said intermittently operating clutch member from said constantly operating clutch member.

21. In a seed planter, a source of power, seed dropping mechanism, operative connections between said source of power and said seed dropping mechanism including a clutch and a locking member adapted to connect said clutch to said source of power, and a plurality of independent means for engaging said locking member and throwing out of operation said operative connections.

22. In a seed planter, a source of power, a constantly rotating member operatively connected to said source of power, seed dropping mechanism, operative connections between said constantly rotating member and said seed dropping mechanism, including a locking member, means for engaging said locking member and automatically controlling said operative connections as the seed planter is operated, and means independent of said automatic means for disconnecting said seed dropping mechanism from said constantly rotating member.

23. In a seed planter, a source of power, seed dropping mechanism, operative connections between said source of power and said seed dropping mechanism including a clutch having a plurality of operating members, a pawl adapted to operatively connect said operating members, a check wire shaft, means carried by said check wire shaft for engaging said pawl and controlling said clutch, and supplemental means independent of said check wire shaft for engaging said pawl and controlling said clutch by changing the relation between said operating members.

24. In a seed planter, a source of power, seed dropping mechanism, operative connections between said source of power and said seed dropping mechanism including a clutch, said clutch having a constantly operating member and a movable member normally in engagement with said constantly operating member and rotatable therewith, means for engaging said movable member at a predetermined point in its rotation for disconnecting said member from said constantly operating member, and supplemental means for engaging said movable member at a point in its rotation distinct from the point first mentioned.

In testimony whereof I affix my signature in the presence of two witnesses.

SAMUEL K. DENNIS.

Witnesses:
C. H. MANGOLD,
W. A. LOFTUS.